United States Patent Office 3,436,934
Patented Apr. 8, 1969

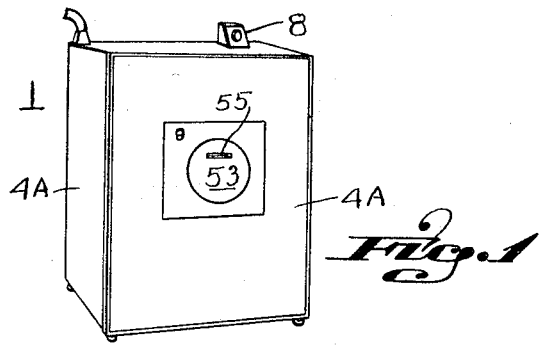
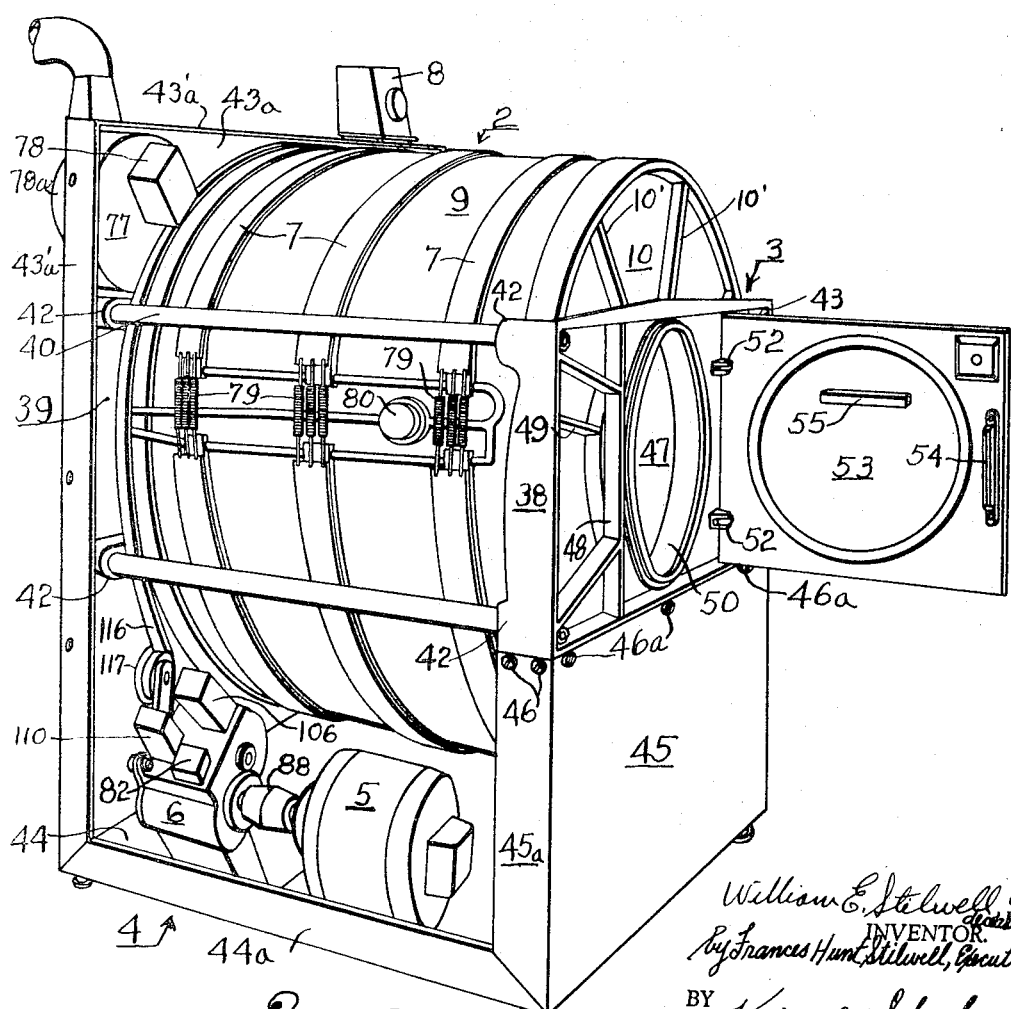

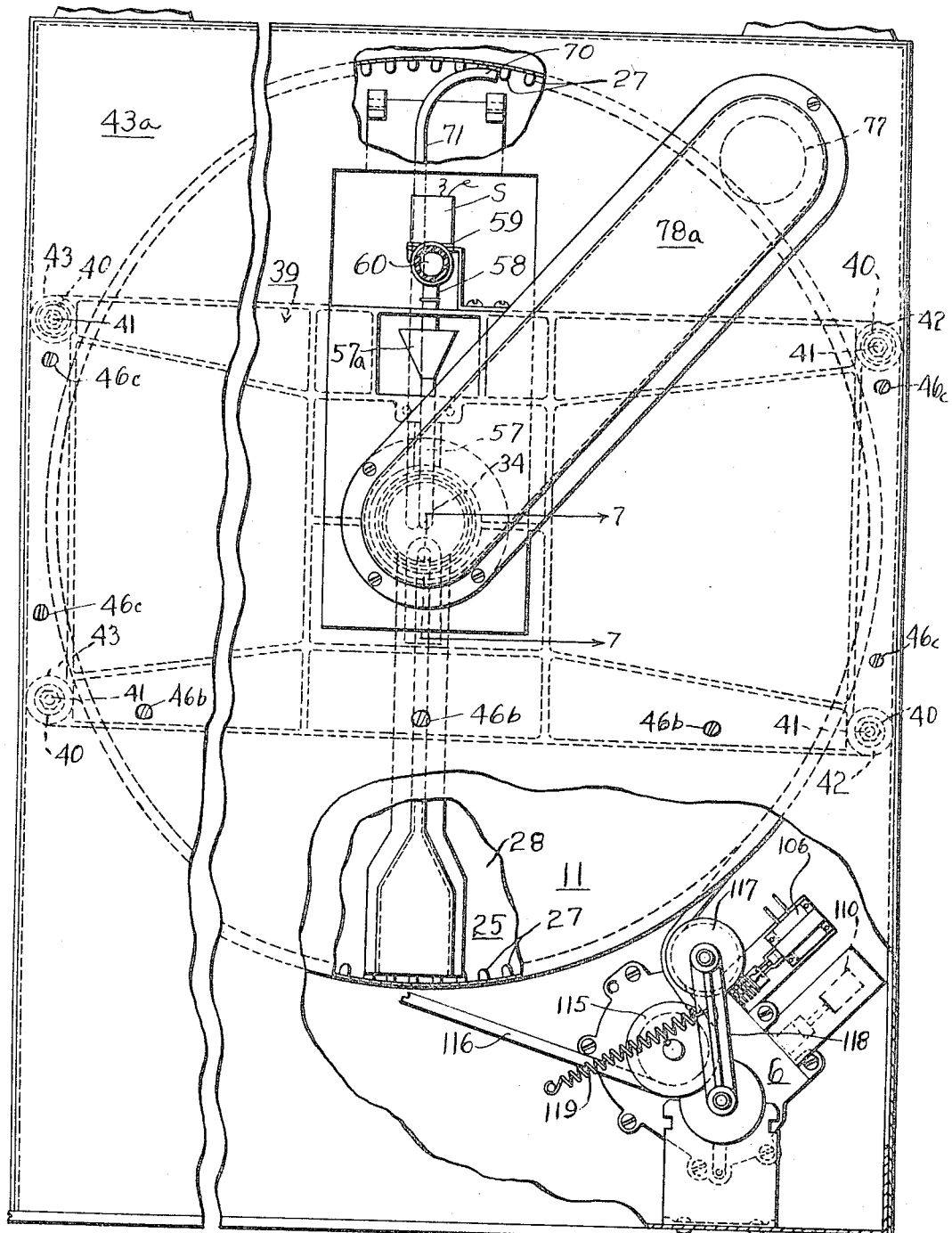

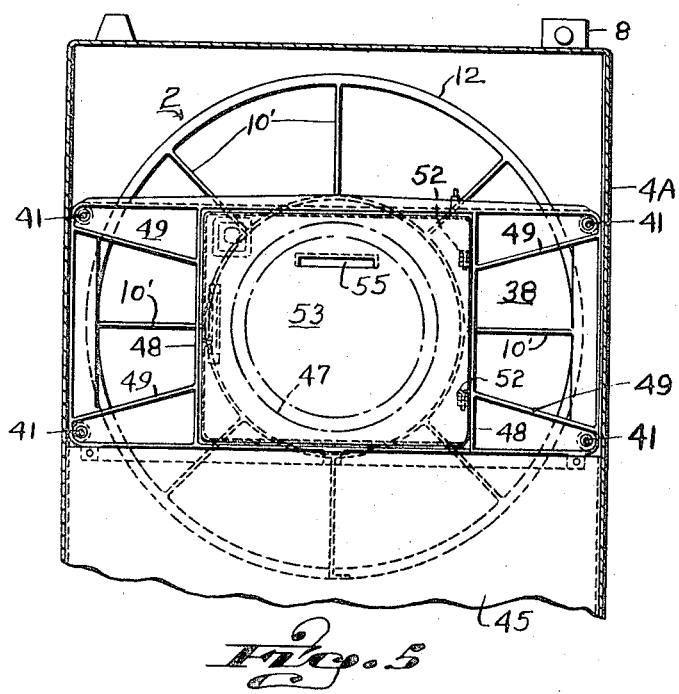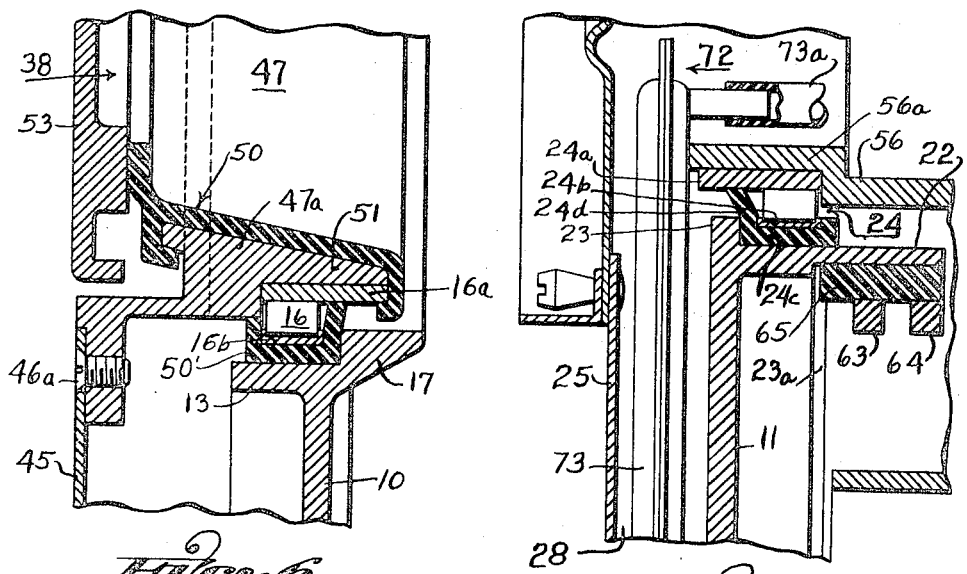

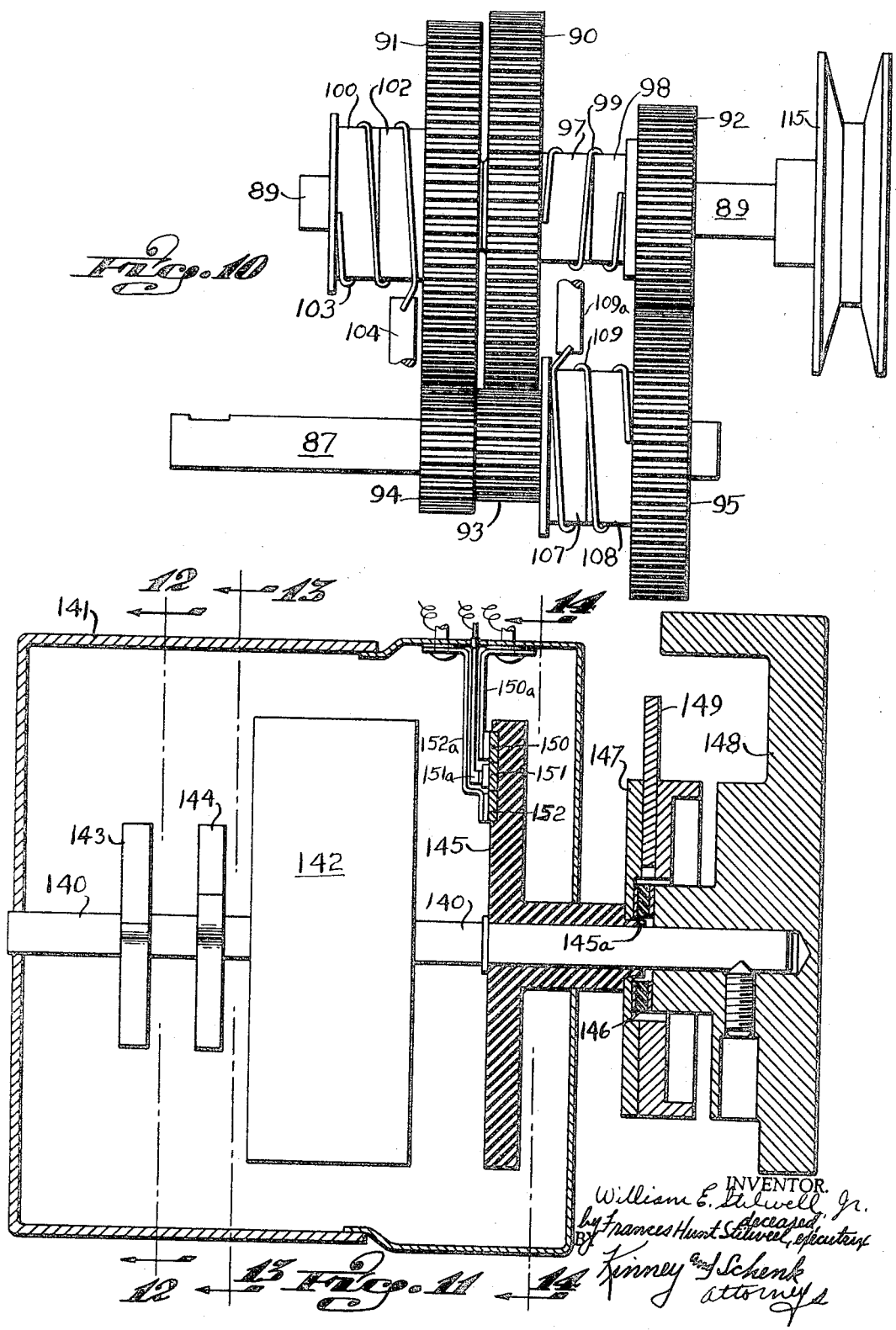

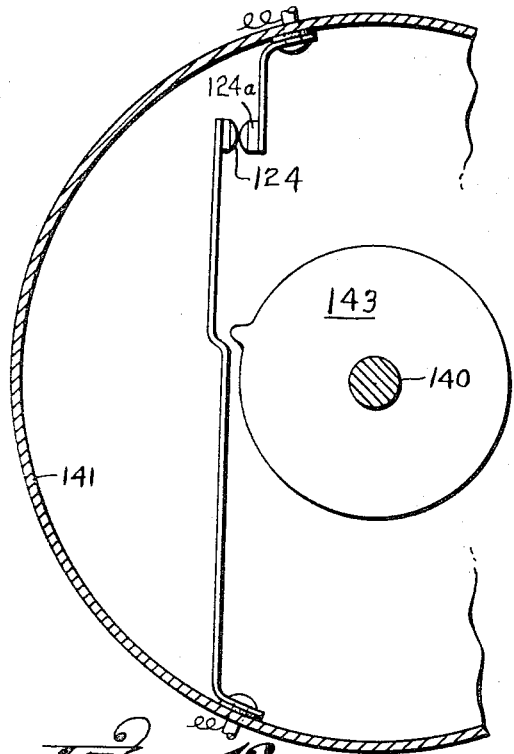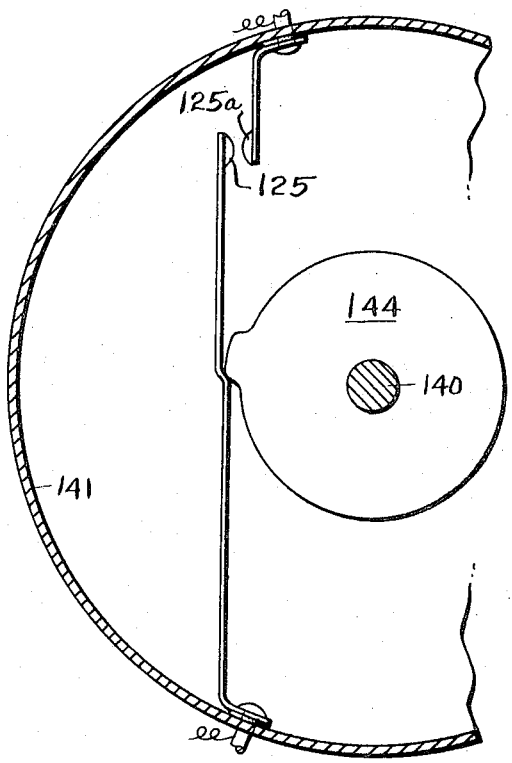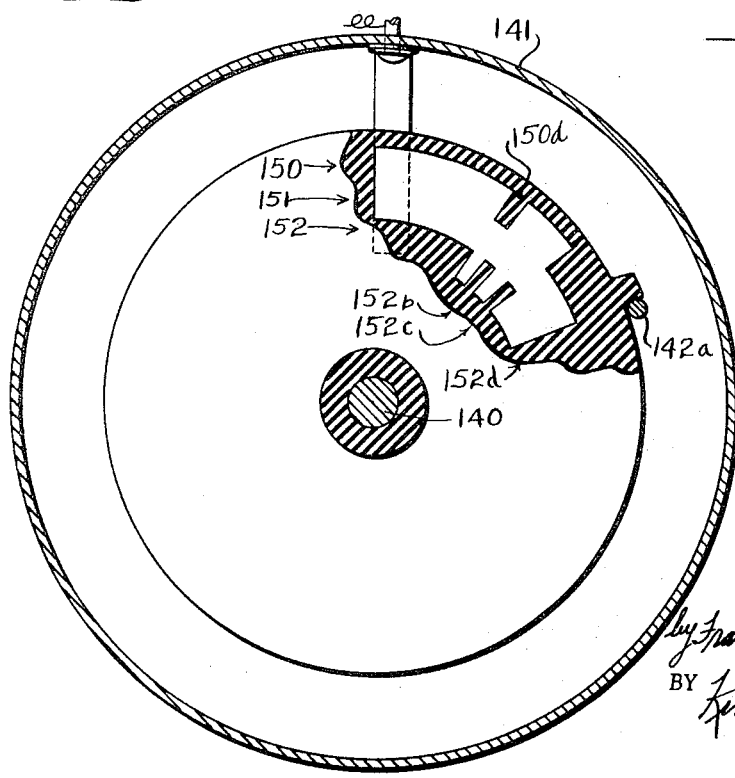

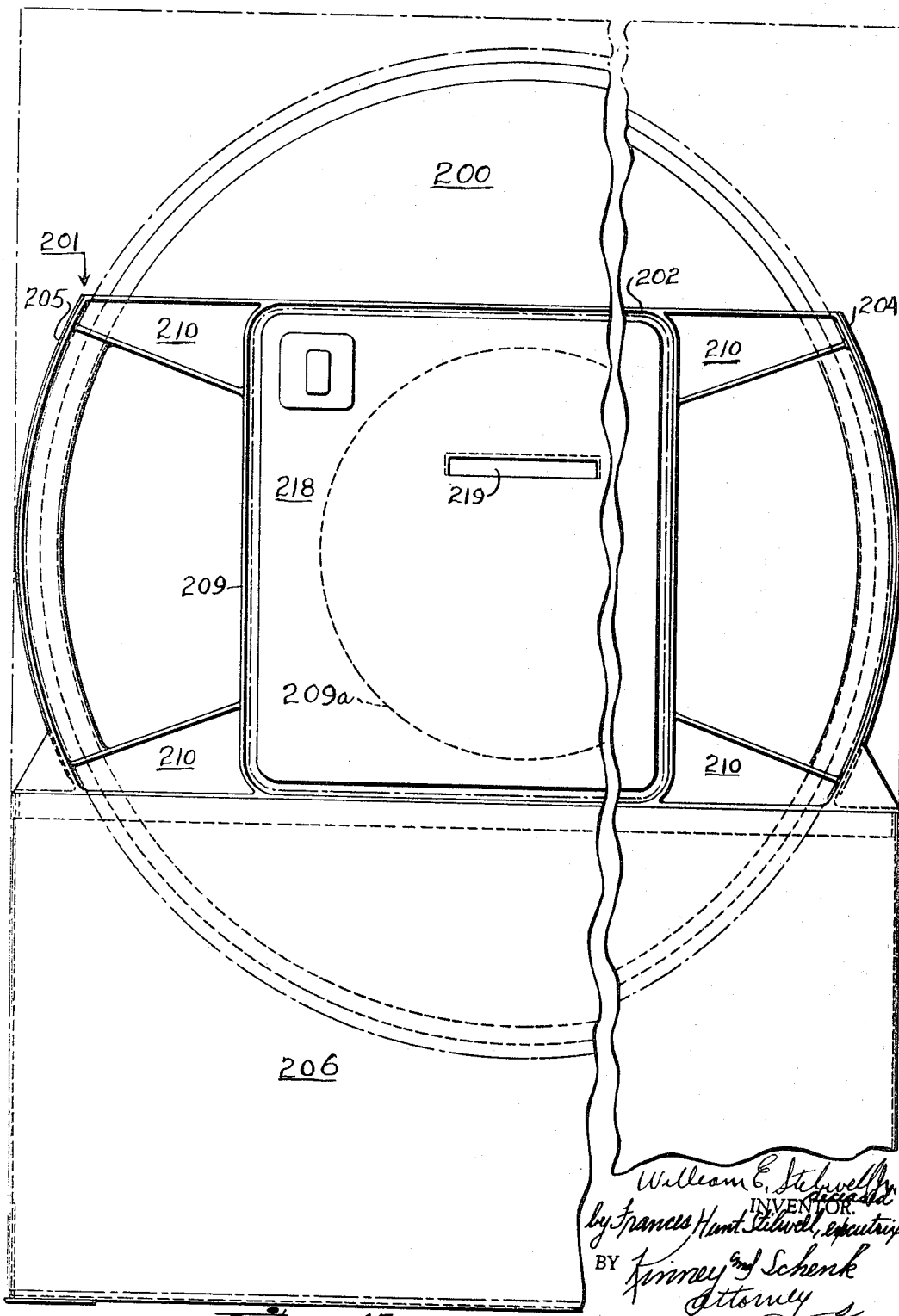

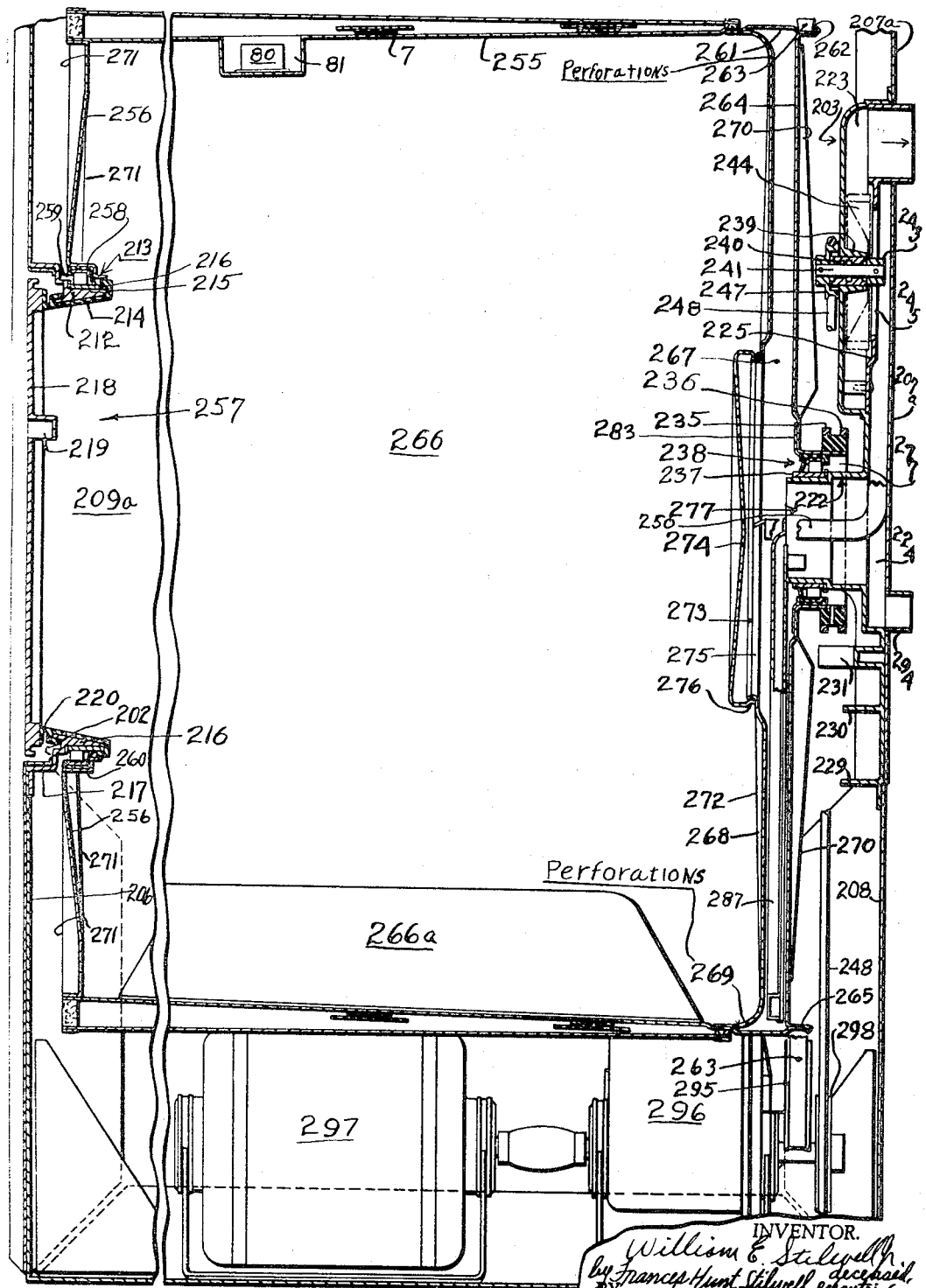

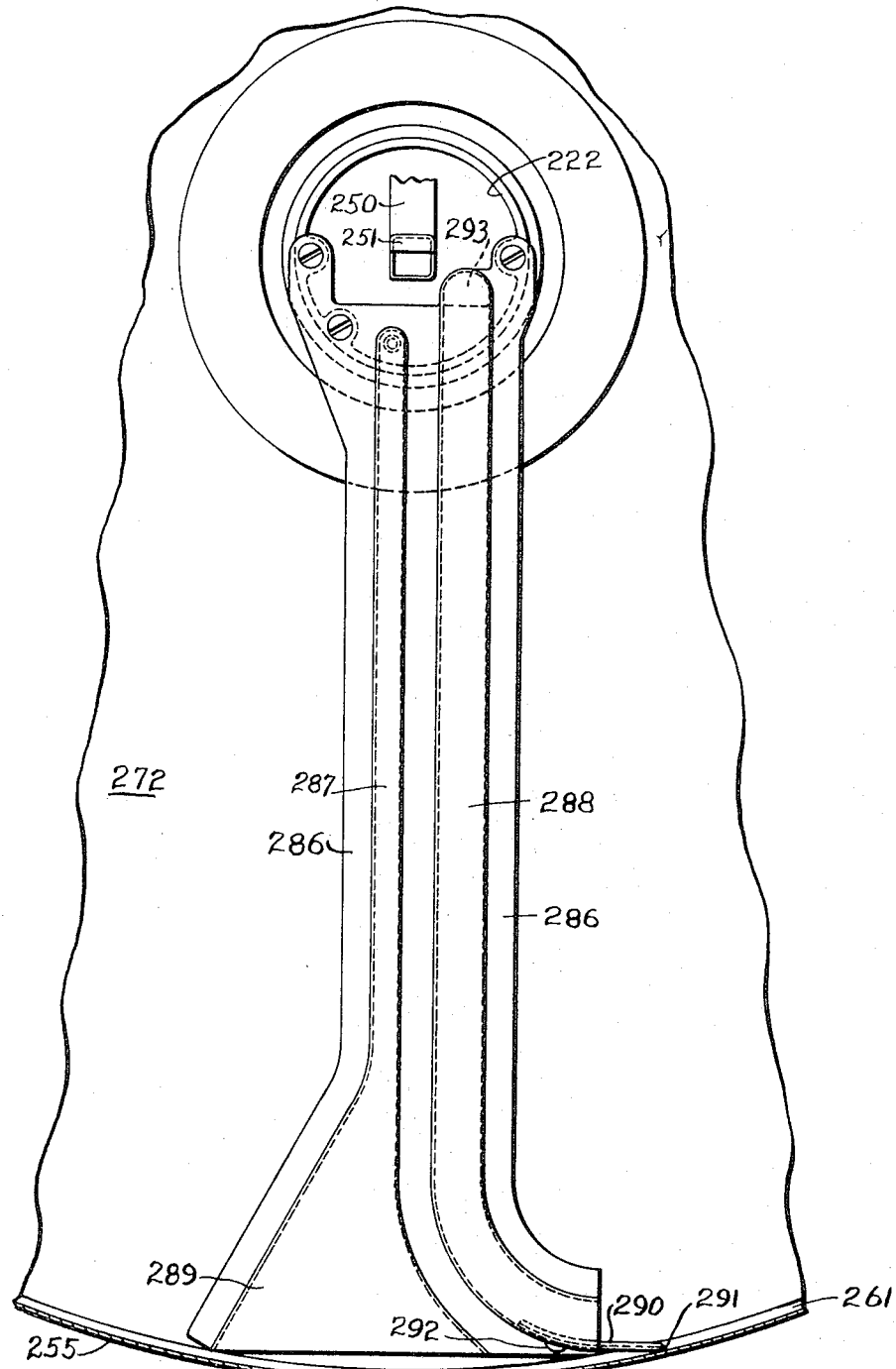

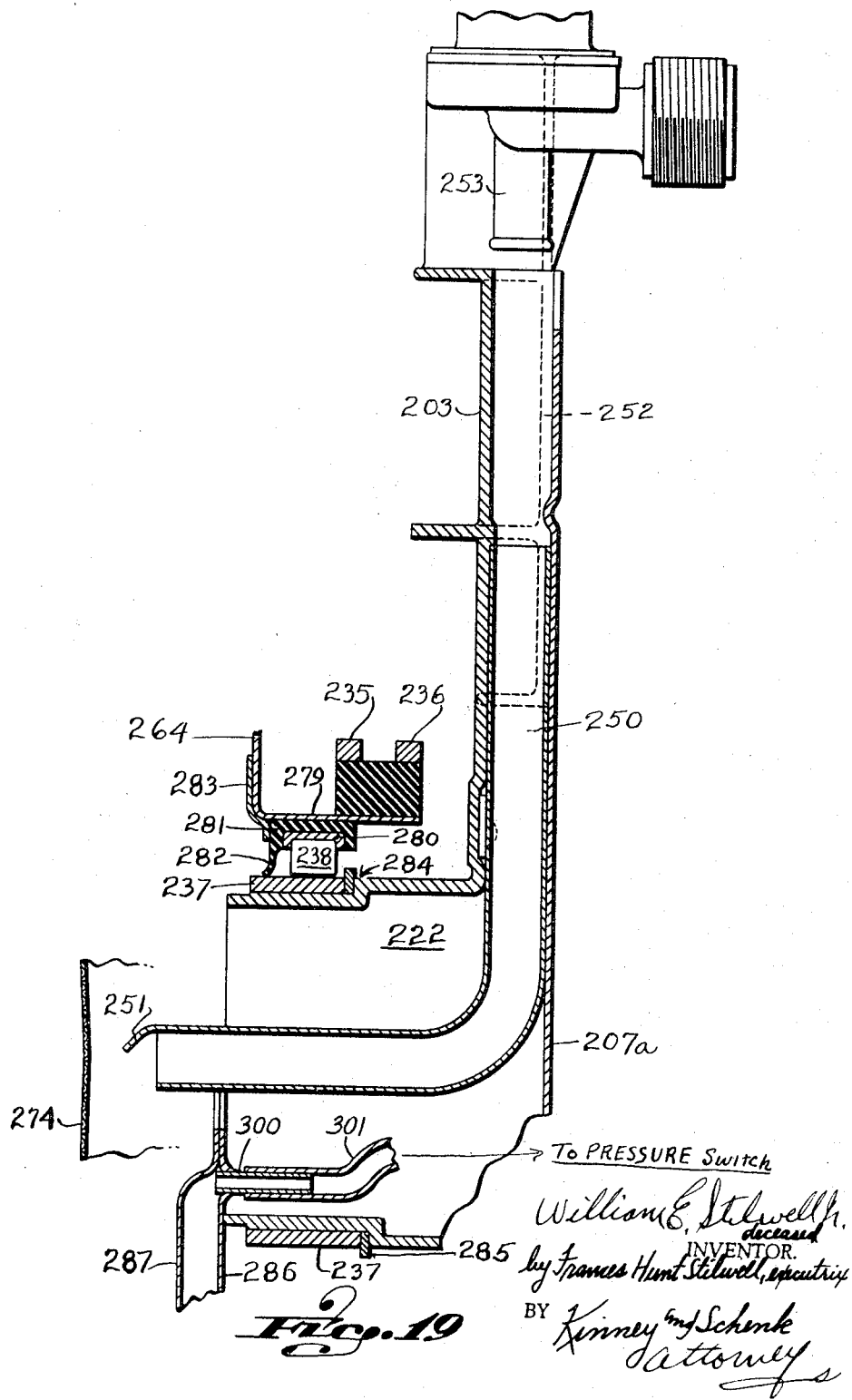

3,436,934
ROTATABLE TUB OF COMBINATION WASHER-DRIER AND MOUNTING MEANS THEREFOR
William E. Stilwell, Jr., deceased, late of Glendale, Ohio, by Frances Hunt Stilwell, executrix, 740 Ivy Ave., Glendale, Ohio 45246
Application Oct. 6, 1965, Ser. No. 497,596, now Patent No. 3,347,065, Oct. 17, 1967, which is a continuation of Ser. No. 305,242, Aug. 26, 1963, which in turn is a continuation of application Ser. No. 808,418, Apr. 23, 1959. Divided and this application Mar. 8, 1967, Ser. No. 642,262
Int. Cl. D06f 25/00
U.S. Cl. 68—140     6 Claims

ABSTRACT OF THE DISCLOSURE

A washer-drier tub is rotatably mounted between a pair of end frames by means of hollow journals and hollow stub shafts at opposite ends of the tub, one of said journals and stub shafts being quite large and of such a size as to comprise the sole means for introducing and removing laundry from the tub.

---

This is a divisional patent application of U.S. patent application Ser. No. 497,596, filed Oct. 6, 1965, now U.S. Patent 3,347,065, which was a continuation of application Ser. No. 305,242 filed Aug. 26, 1963, which was a continuation of application Ser. No. 808,418 filed Apr. 23, 1959.

This invention relates primarily to home laundry appliances and more particularly to washer-dryers comprising only one imperforate tumbler tub, instead of two tubs, as in the prior art where one of them was a perforate tumbler and the other a stationary imperforate outer tub.

More particularly, the invention relates to a home laundry machine which is designed to wash, rinse and dry laundry in a single tumbler tub.

It is therefore an object of the invention to provide a machine which, in a preferred embodiment thereof, comprises a basic unit including a single, imperforate, tapered, hollow tub having double hollow journals supported in bearings in a cage or frame which may be supported in a shell or dress-up housing.

A further object is to provide a washer-dryer having the largest laundry capacity in the smallest cabinet of any contemporary machine, in order to obtain the best laundering results per dollar of purchase price and per square foot of floor occupancy.

For example, in a preferred embodiment of my invention, the tumbler tub volume is 6 cubic feet, the tub is housed in a cabinet 27" wide, 25" deep, and 34" high in contrast with the largest capacity contemporary home dryer of 5.8 cubic feet housed in a cabinet 31" wide, 26" deep, 36" high, or with the latest contemporary washer-dryer of only 2.4 cubic feet capacity and having a cabinet 27" wide.

A further object is to provide a simple but structurally sound means for rotatably mounting the imperforate tumbler tub and for furnishing access means for air and water and the loading of the same with clothes and the removal thereof from the tub. In competititve, two-speed machines, the practice is to mount the inner tub on a cantilever support provided with a cone bearing. That support also constitutes the rear end plate of the outer tub. Such a mounting not only limits the volume of the inner tub, but it also imposes excessive loads on the bearings during the spinning operation. In the preferred embodiment of my invention, the imperforate tumbler tub is provided with a hollow journal at each end, each of which is supported in bearings mounted in a stationary cage or frame comprising two end members laterally joined by two arcuate, rigidifying alignment plates, or by spacers and tie rods. The demountable cage or frame may be fastened to eithrer a J or a U section base. Integral with the end members are stubby, hollow, stationary shafts. The front frame member is equipped with the door hinge mountings, and the rear frame member is furnished with the slip ring brushes, a water valve and water inlet tube, pressure switch mountings, and a blower housing and duct. The entire supporting means is abnormally strong and inexpensive; the clothes door is slotted to provide an inlet for ambient air, the front shaft may have a 12" bore in a preferred embodiment, for the clothes opening, and the rear hollow shaft may have a three inch bore to accommodate the water inlet, the water outlet and the exhaust air outlet.

A still further object is to provide a machine requiring a minimal cabinet, instead of the elaborate cabinets found in conventional contemporary machines. This object is accomplished by concentrating the needs of structural strength in the cage-tub assembly itself, so that the J frame merely supports the weight of this assembly and the dress-up shell that furnishes aesthetic appearance only.

Finally, it is an object, which is associated with the primary object, to correct the traditional imbalance in the home laundry appliance market saturations; specifically my invention is directed to correcting the trend whereby 76% of the total annual sales of automatic washers involve replacement sales, the market being so dissatisfied with what is available for the handling of the drying function, even though all washed clothes must be dried. Accordingly, it is an object to make available to the replacement market a functionally superior, basic laundry unit washer and dryer at a cost materially less than the cost of washers now available for such replacements.

The foregoing and other objects of the invention will be apparent to those of ordinary skill in the art to which the invention pertains from the following description and the drawings.

In the drawings:

FIG. 1 is a view in perspective of a laundry washer-dryer embodying a form of the invention;

FIG. 2 is an enlarged view in perspective of the washer-dryer, the dress-up housing and insulation being removed;

FIG. 4 is a partial view in rear elevation of the machine shown in FIGS. 1, 2 and 3, parts thereof being shown in section;

FIG. 5 is a partial view in front elevation, parts being in section, showing the loading and unloading end of the washer-dryer embodying the invention;

FIG. 6 is an enlarged view in section taken on line 6—6 of FIG. 3 showing the front hollow tub journal, the hollow stub shaft therefor, the anti-friction bearing, and the seals;

FIG. 7 is an enlarged view in section taken on line 7—7 of FIG. 3 showing the hollow journal at the rear of the tub, the hollow stub shaft, the anti-friction bearing therefor, the seal and the mounting of the slip ring;

FIG. 10 is an enlarged more or less schematic view of the transmission of FIG. 8;

FIG. 11 is a view in longitudinal vertical section of a timer of the control circuit;

Figure 16:
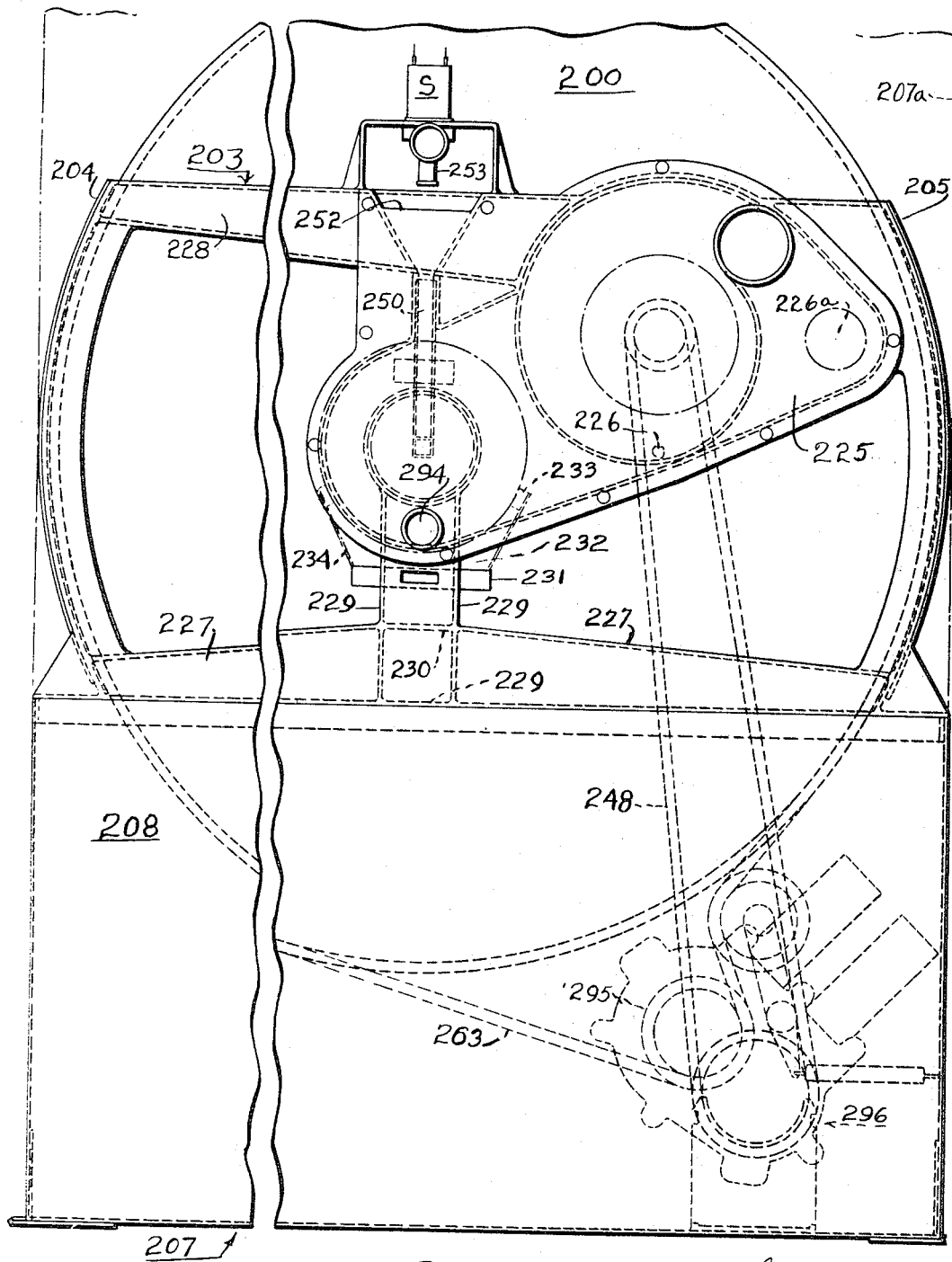

FIGS. 12, 13 and 14 are views in sequention taken on lines 12—12, 13—13 and 14—14 of FIG. 11 showing certain cams embodied in the timer;

FIG. 15 is a fragmentary view in front elevation of a modified form of basic washer-dryer unit embodying the invention;

FIG. 16 is an enlarged fragmentary view in rear end elevation of the machine shown in FIG. 15;

FIG. 17 is a fragmentary view in longitudinal, vertical section of the machine illustrated by FIGS. 15 and 16;

FIG. 18 is an enlarged view of the water scoop and water level control means embodied in the machine of FIGS. 15, 16 and 17; and FIG. 19 is a view in vertical section to an enlarged scale, illustrating the support frame at the rear end of the machine of FIGS. 15 through 18 inclusive, showing the tub water inlet means, the slip ring, the rear journal bearing and a portion of the water level control tube.

In the drawings, the laundry machine 1, embodying, what now appears to be a preferred form of the invention, comprises a single, imperforate wall, tumbler tub 2 mounted for rotation in a rigid cage or frame 3, which together form the basic unit. That unit is attached to and carried by a J section frame 4 of sheet metal which also supports the dress-up cabinet shell 4A.

The tub 2 may be rotated at operating speeds by means of a motor 5 and a multi speed transmission 6.

In order that the wash and rinse water may be heated in situ, that is in the tub, by conduction, during the washing cycle, means 7 are provided for heating the imperforate tub wall of tumbler 2. The particular means 7 illustrated comprises electric heating elements of the mica-backed, wrap-around type, mounted on the exterior of the tub wall. This same heater means is used for drying the clothes by conduction during the drying cycle.

During the washing cycle, the transmission 6 is set to provide a relatively low speed of the tumbler, that is, a speed sufficient to provide a fraction of a G of centrifugal force. Another speed of the transmission provides about 1 G for distributing the load in the tub preparatory to extracting the water from the load at a much higher speed of the tub, for example, a speed that provides a centrifugal force of approximately 25 Ga.

The operation of the motor and the speed shifting mechanism of the transmission, including the introduction of water and the proper cycling of operations of the machine from washing to rinsing to final extraction and drying is accomplished by a timer control mechanism 8 described infra.

THE TUMBLER TUB 2

The tumbler tub 2 comprises a hollow, imperforate member 9 that constitutes the wall of the tub, and front and back walls 10 and 11. Member 9 tapers from one end to the other in order that the water will flow to the large end thereof when voiding water and detergent solution extracted from the laundry load, as the tub is rotated at extraction speed. Thus, the tub is essentially frusto-conic in shape and, in the illustrated embodiment it flares from front to back so that the large end is at the back of the machine. The flare may be of the order of ½" in 20" or 2.5" per 100" of length. The flare may also be from back to front, in which case the water level control means and the water removal means would be located at the front end of the machine.

Figure 3:
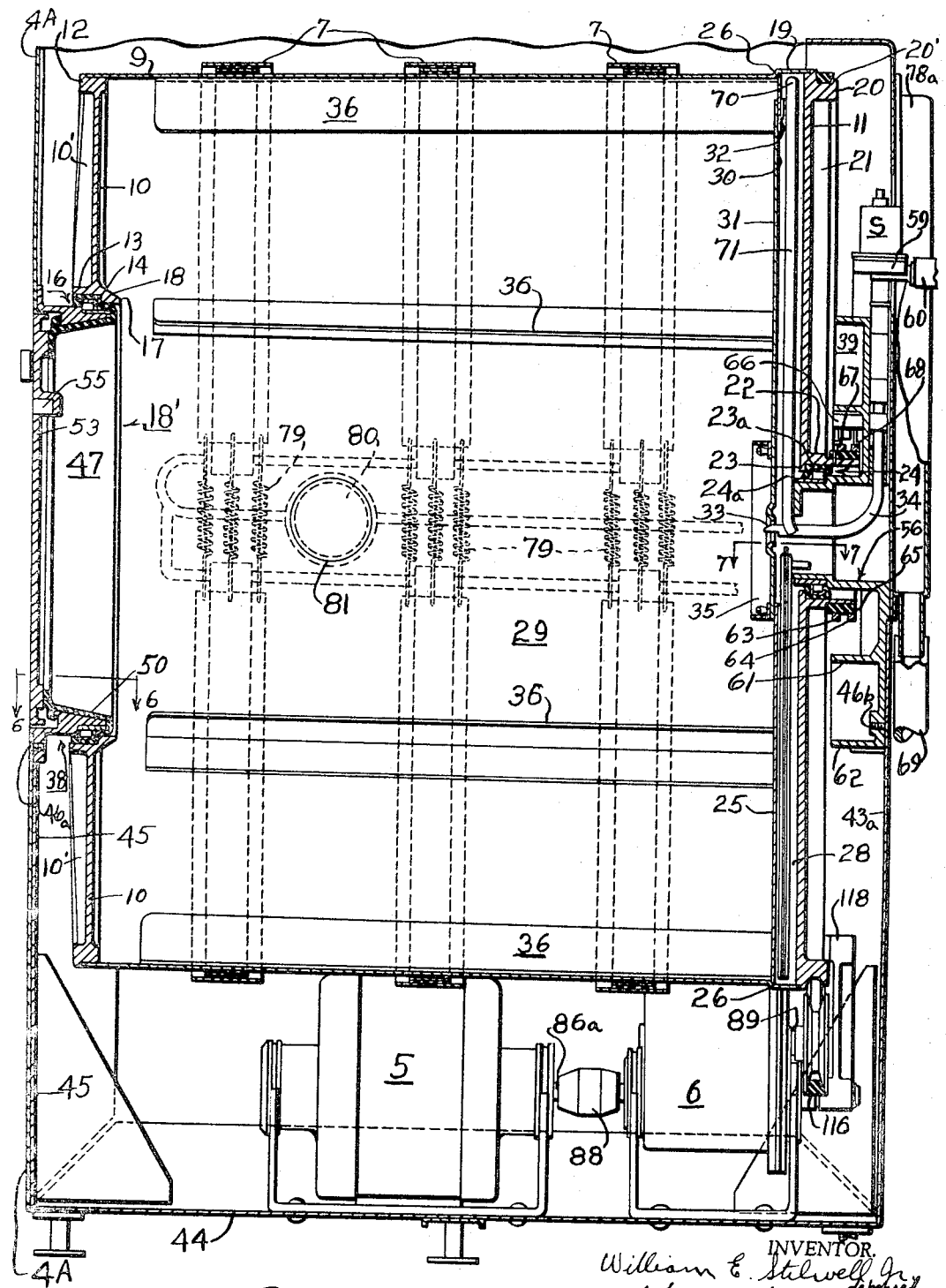
FIG. 3 is a view in longitudinal, vertical section of the machine shown in FIGS. 1 and 2.

The front wall 10 is made strong and rigid. In one form, it may be manufactured as a casting having a recessed rim 12 for receiving the front end of the wall member 9. Wall 10 is formed with ribs 10' extending radially from its hollow tub 13 to further strengthen and rigidify the same (FIGS. 2 and 3). Hub 13 is recessed to accommodate the outer race 14 of a roller or other anti-friction bearing 16. The inner end of the hub 13 is provided with an annuar flange 17, the surface 18 of which slopes downwardly and inwardly of the tub to protect the bearing from water and detergent solution.

As shown, there is a relatively large opening 18' in the hub 13 to accommodate laundry placed into or removed from the tub.

The back end of the tub wall member 9 is provided with an outwardly extending annular channel 19 (FIG. 3), the function of which is to confine the centrifuged or extracted water and serve as a scoop race and facilitate water removal.

The tub back wall 11, like the wall 10, is preferably of rigid construction and in one form may comprise a cast member having a flat rim 20 for receiving the large end of the tub wall 9. Wall 11 may also be provided with stiffening ribs 21 extending radially from its hollow hub 22. If desired, the rim 20 may be provided with an integral, grooved pulley 20' by which the hub may be belt driven.

As may be seen in the drawings, the hub 22 and its opening are materially smaller in diameter than the opening 18' in the hub 13. The inner end of hub 22 is provided with an annular shoulder 23 for retaining a roller or other anti-friction bearing assembly 24.

The tub 2 with its end walls and the frame 3 constitute a basic laundry unit designed to be supported by a formed sheet metal frame end enclosed by a dress-up shell which serves the aesthetic appeal. Such a basic unit requires but one tooling, one assembly line and a single inventory of parts.

The basic unit itself to up-grading by the addition of various and sundry devices which for the most part merely add to the price the consumer pays without increasing the utility of the machine.

In order to provide for the control of the free water and the free detergent solution level in the tumbler tub and also to provide for the voiding of wash and rinse water when the tub is driven at extraction speed, a circular partition 25 is provided adjacent to, but spaced a short distance from the inner face of the end wall 11. The diameter of the partition is such that it engages the inner corner 26 of the channel 19 to which it is secured. At the periphery of the partition uniformly and relatively closely spaced notches or serations 27 may be provided to allow for the free flow of water or solution between the level control-voiding and the laundry load compartments 28 and 29 formed by the partition 25.

The means for withdrawing water and solution from the voiding compartment 26 and controlling the quantity of free water or solution in the tub will be described infra.

The partition 25 is provided with an opening 30 through which access to the compartment 28 may be had to clean the same and remove any lint that may have found its way through the serations 27. Opening 30 may be closed by a removable cover plate 31 having a clip 32 for receiving the edge of the opening 30. The center of plate 31 is provided with an opening for accommodating a nozzle 33 of a water supply fitting or tube 34. On the inner face of plate 31 is a circular flange 35 which is secured to the same and to partition 25 by screws or rivets or other means. The flange 35 serves as a guard for the nozzle 33 and prevents the dropping of laundry upon it as the tub rotates.

In order to impart a dropping or tumbling action to the laundry load, the inner face of the tub member 9 is provided with a plurality of uniformly spaced baffles 36. In the particular tumbler shown, there is provision for six baffles, spaced 60° apart. The baffles may be secured in any suitable manner to wall member 9 as by spot welding.

The efficiency of the washing-distributing and rinsing-distributing action of a tumbler machine is influenced by the radial depth of the baffles, the diameter of the tumbler tub 2 and the quantity of free water or solution therein.

Some seventeen years ago, a United States patent disclosed, in connection with perforate wall tumbler washers, a speed range ratio of $50/R$ to $54.77/R$ where $R$ was the radius of the tub in feet. For a 26-inch diameter tub, such as employed in a specific form of the machine disclosed, this speed range ratio would be between 47.8 to 52.4 r.p.m. In the particular machine herein disclosed, it has been found that the speed ratio range lies between from 38 r.p.m. for the tumble washing speed, to 52 r.p.m. for tub produces a centrifugal force of 0.54 G and a distributing speed of 52 r.p.m. produces 1 G. The ratio range disclosed in the aforementioned patent was based on a theory as applied to a perforate tub, whereas the ratio as applied to the instant machine is lower because of the fact that the tub is imperforate.

If it be assumed that the tumbler tub 2 rotates clockwise, the baffles will lift the laundry load to about the 11:00 o'clock position before dumping it off in a parabolic path. The configuration of the parabola is a function of tub speed, tub diameter, the clothes loading and the tub water loading or level. Much of the washing action occurs at the 5:00 o'clock impact area. A tumbler tub machine, washing at its rated load, will need a high r.p.m. running speed if its baffles are low and a low r.p.m. running speed if its baffles are high in order to achieve correct tumbling and maximum washability.

The greater the depth of the free water loading in the tub, the higher the baffles must be if balling and floating of the clothes are to be avoided. The wetter the clothes during distribution, the higher the tub speed must be to effect satisfactory distribution. The lower the volume of water carried by the tumbling clothes, the easier the clothes are to distribute evenly. The more even the distribution of the laundry load among the baffles, the less the machine vibrates while water is extracted from the clothes by spinning the tub at high speed.

It is also to be taken into account that balling of the clothes will occur during the fluff drying cycle unless the baffles are sufficiently high.

In the aforementioned patent, it was disclosed that the peripheral speed of a perforate tub should be between 0.923 G and 1.01 G. The argument was, that if the peripheral speed, the baffle configuration and the water loading were arranged to produce tumbling at just below 1 G, then upon draining the free water from the tub, the latter would accelerate to its 1 G distributing speed. However, this teaching resulted in poor washing in tumbler tubs.

It has been discovered by experimentation with the present invention that much better washability can be effected within a tumble speed range of 0.4 to 0.8 G, this being the speed range in which good tumble fluff-drying occurs.

In short, an acceptable washer-dryer requires a tumbler speed so much less than the distributing speed, that a separate distributing speed should be utilized. If the clothes are not adequately distributed before the extraction operation, excessive vibration develops unless isolation means are added. Distributing of the load is even more important in the case of an imperforate tub machine because therein not even the free water can be removed until the peripheral speed of the tub is above 2 G's, in which event, all of the water load, including the clothes load, must be accelerated in order to effect draining of the tub.

In imperforate tubs, a distributing speed is of the utmost importance to reduce vibration resulting from unbalance of the laundry load and to reduce the motor torques required to accelerate the tub from tumbling to spin or extraction speed. For the purpose of this invention and to accomplish low vibration performance, a three-speed transmission is utilized.

The particular value of the spin speed to be used in a given case, is often conjectural, since centrifugal extraction, although quick and efficient, involves the limitations of tolerable vibration and machine cost. The mounting system for the tub of this invention is far superior to that employed in machines heretofore and presently constructed. But because of its low weight, it has relatively low self-damping. Heavier machines are more stable at high speed rotation of an unbalanced load; however, by distributing the laundry load after the washing cycle but before the extraction cycle begins, the unbalanced weight is materially reduced. By employing double journal bearings, as disclosed, whipping action of the tub is reduced to a minimum. By providing the bearings with resilient mountings, as described infra, vibration is adequately handled.

In the present invention, washing of laundry is accomplished in what would normally be, by present day standards, a dryer, which means that the radial thickness of the spinning annulus of the clothes is much less than it is in contemporary machines that dry in a separate dryer. That is, the larger the clothes loading per unit of tub volume, the easier it is to get uniform distribution of the clothes prior to extraction.

All things considered, it is preferred to spin the tub of this invention at about 25 G's or 250 r.p.m. That generally means there will be slightly less than 100% retention in an 8-pound load of Indian Head test clothes. Although this is much better than can be obtained in many competitive devices, it is not as good as the extraction obtained in machines operating at 550 r.p.m. or higher. However, the machine of this invention is capable of evaporating water at the rate of about 0.25 pounds per minute. Thus, if the spin cycle is followed by only 10 minutes of fluff drying, the water retention is reduced to that obtained by very high speed extraction machines.

The selection of a proper tumbling speed rests upon baffle configuration and free water loading. In the imperforate tub machine of this invention, means are provided for automatically proportionalizing the amount of inlet water to the size and type of clothes load. This means, that no matter how much water the clothes naturally soak up and carry, there will generally be the same volume of extra or free water in the tub. The free volume is approximatey 1 gallon in a six-cubic foot imperforate tumbler tub. This, with one gallon of free water, a baffle configuration and a tub speed can be devised that will be satisfactory for both tumble washing and tumble drying. With an average total water loading of some four gallons, a normal drying cycle heater having a capacity of 5,500 watts can heat the water from an average inlet water temperature of 70° to the recommended washing temperature of 140° in an average washing time of approximately 10 minutes. With such a water loading, the baffle height varies between 10% and 20% of the tub diameter and the tumble speed varies between 0.4 and 0.7 G. The preferred speed is then about 38 r.p.m. Thus, the tumble washing, rinsing and drying are done at a fraction of 1 G; the distributing is done at a speed of about 1 G and spinning or extraction at a multiple of 1 G. The distributing speed contributes materially to a reduction in vibration and without it, unbalanced loading with consequent high or bad vibration would result.

By means of the water level control element in the voiding compartment 28 and the water level control means described infra, the water supplied the machine is automatically proportioned to the load of clothes in the machine, and the capacity thereof to absorb water. Thus, no matter how much laundry load is in the tumbler, provided the load is within its capacity, sufficient water will flow into the machine to saturate the clothes and provide about one gallon of free volume of water. That free volume accumulates in the compartments 28 and 29, and will be the same in value regardless of the weight of the load in pounds because it is determined by the level of the water or solution in the compartment 28. The level control operates to shut off the supply as soon as the controlled level of free water is reached. Furthermore, as will be shown infra, that level is automatically maintained in the wash and rinse cycles. If the machine overflows because of excessive suds and a consequent carry out of water, more water is added automatically to restore the level. In doing so, particularly in the washing cycle, the suds are reduced by the inflow of cold water which is desirable because excessive suds caused the overflow in the first place and secondly, excessive sudsing imparts the quality of the washing action.

THE CAGE OF FRAME 3

The cage or frame 3 comprises front and back frame members 38 and 39 rigidly connected to each other by tubular spacers 40 and tie rods 41 extending through the same and the bosses 42 and 43 at the four corners of the members 38 and 39. On the ends of these tie rods suitable nuts are threaded and drawn up sufficiently to place the rods in tension and the spacers in compression. The hollow journals of the tub end walls, the stub shafts on the frames 38 and 29 with their anti-friction bearings, together with the spacers and the tie rods thus form the basic washer-dryer unit of the invention. The details of these features are described infra.

The above mentioned basic washer-dryer unit 3 is mounted to the J frame 4. Frame 4 has a back 43a, a bottom 44 and a front 45. The edges of the back, bottom and front are formed with right-angled flanges 43'a, 44a and 45a to accommodate fastening screws or stove bolts where needed in the assembly of the machine. As shown, the flanges are cut on a bias at the corners and may be welded or otherwise suitably secured to provide a rigid structure. Gussets and other stiffening members may be employed also to rigidify the frame.

The front frame 38 is suitably flanged at the inner edges of the sides, top and bottom thereof whereby it may be bolted to the flanges 45a of the frame 4.

The basic unit 3, when mounted on frame 4, rests at the front on the top flange of the front wall 45 to which it is secured by bolts 46 and 46a (see FIGS. 2, 3 and 6), while the back frame 39 thereof is secured by bolts 46b and 46c to the back 43a of the J-frame (see FIG. 4).

The back 43a stands slightly higher than the top of the tumbler 2 to accommodate various auxiliaries mounted thereon as for example, the timer 8, as explained infra.

The front frame 38 is shown quite plainly in FIGS. 2, 3, 5 and 6. It is preferably made as a die casting, and its center is formed with a relatively large opening 47 framed by a specially formed flange construction 47a from which strengthening or stiffening ribs 48 and 49 radiate to the top, bottom and sides of the frame. The opening 47 registers with the opening 18' of the tub 2.

The specially shaped flange 47a is so formed as to be adapted to receive a similarly formed snap-on seal ring 50 of rubber or plastic (see FIGS. 3 and 6). The inner portion 51 of flange 47a constitutes a hollow journal that accommodates the inner race 16a of bearing 16. A resilient seal and bearing mount 50' of substantially L-shape is provided for the bearing 16. It retains the outer race 16b of the bearing. The long leg of seal 50' engages the bearing race 16a and the short leg engages the underside of the flange 17. The seal 50' performs two important functions: (1) it protects the bearing from water and detergent; and (2) it provides a resilient mounting for the front bearing 16 of the tub, thus tending to materially reduce vibration of the machine, particularly at the centrifuging speeds. The seal 50' and the flange 17 of front end wall 10 of tub 2 also shield the bearing 16 from water and detergent.

The frame 38 is provided with hinges 52 on which a door 53 is hung to close the machine when in operation. The door may be held shut by means of a permanent magnet 54.

In order to provide for the drawing of ambient air through the tub 2 during the laundry cycles, the door 53 is provided with a slot 55 of sufficient area to permit a flow of 15 c.f.m. or more of air per minute through the tub.

The back frame 39 is shown in elevation by dotted lines in FIG. 4, and in section in FIG. 3. It is formed preferably as a die casting and provided, as shown, with stiffening ribs and flanges located on and projecting inwardly from the inner face thereof. The central portion of frame 39 is provided with a hollow stepped journal 56 for accommodating the inner race of bearing 24 and supporting the back end of the tumbler tub 2. The journal 56 being hollow, communicates with the tub voiding and level control chamber 28. It also includes a vertical tubular passage 57 to the lower end of which the water inlet pipe 34 is connected. The upper end of the passage 57 is provided with a funnel 57a into which the outlet pipe 58 of a solenoid valve 59 of the "on" and "off" type, discharges. The water supply to the valve is furnished by an inlet pipe 60.

Frame 39 is provided also with inwardly projecting spaced concentric flanges 61 and 62. The flange 61 forms with the hub or journal 56 an open housing for slip rings 63 and 64 carried by and insulated from the hub 22 of the tub back wall 11, as shown, with insulation 65. The slip rings provide a means for connecting the supply voltage to the heating elements 7. When a three wire 220 volts supply is used, the tub is grounded through the rear bearing. Frame 39 also carries a brush holder 66 having brushes 67 and 68 riding on the slip rings as shown in FIG. 3.

The journal 56, being hollow, provides a passage for the water being voided or expelled from chamber 28, the passage leading to a drain hose or pipe 69 by which the water is conducted to the sewer or other place of disposal.

The bearing and slip ring construction at the back end of tub 2 is shown by the enlarged fragmentary half section of FIG. 7. As illustrated, the tub journal extends rearwardly of the end wall 11 and is provided with the inwardly extending shoulder or flange 23 against which the inner edge of bearing 24 abuts. The outer surface of the journal is stepped as at 23a to receive a slip-ring insulating layer 65 on which the slip rings 63 and 64 are mounted.

The journal 56 is provided with an annular step 56a that receives and retains the inner race 24a of bearing 24. The outer race 24b of the bearing is received in a resilient ring 24c of rubber or suitable plastic, and of substantially L-shape in section. The inner leg 24d of the ring engages the inner race 24a, thereby forming a seal to keep water and detergent solution off the bearing rollers and the races.

As the bearings at each end of the tub are supported resiliently, vibration is kept low at all speeds of operation of the tub.

In order to void or expel water and detergent solution thrown into the channel 19 by centrifugal force when the tub is spinning at the extraction speed, a stationary scoop 70 (FIG. 4) is provided and mounted in the chamber 28. The open end of the scoop faces into the channel contra the direction of rotation of the tub. The water annulus in the channel is directed by velocity head into the scoop and thence through a scoop pipe 71 into and through the hollow journal 56 to drain.

WATER LEVEL CONTROL

To control the level of water in the tub chambers 28 and 29, a level responsive control means 72 is disposed in chamber 28 and mounted to the journal 56 (see FIGS. 3 and 7). It comprises a hollow tube 73 extending downwardly into chamber 28. The lower end of that tube is open and terminates at a level slightly above the underside of the tub, preferably at the 6:00 o'clock position. The upper end of the tube 73 is connected by a flexible hose 73a to a chamber 74 in which is mounted a diaphragm 75 for operating normally closed electric contacts 76 and 76a disposed in series circuit with the solenoid S of the valve 59 (see the circuit in FIG. 10a). As the water level rises in the tube 73, the air trapped therein is compressed, and when the water level reaches the set point or the controlled value, the diaphragm opens the contacts 76 and 76a, the solenoid of the valve is de-energized, the valve closes, and the water supply is shut off.

VAPOR REMOVAL

As the machine operates through its washing, rinsing and drying cycles, water vapor forms which is removal by an exhaust fan 77 (FIG. 2) mounted on the back 43a of the J frame 4 and driven by a motor 78. The vapor flows through the journal 56 and a duct 78a leading to the intake of the fan by which it is discharged to the atmosphere or to a suitable vent, such as a chimney flue, for example. The duct is formed as a flanged channel and bolted as shown to the back 43a. When the machine is drying clothes, it is desirable that ambient or room air be pulled through the tub. That is accomplished by the fan, the air being admitted through the slot 55 in the door 53.

The electric heating elements 7, as stated, are preferably of the flat, mica-backed Nichrome resistance type which can be wrapped around the tub as shown in FIGS. 2 and 3 and the adjacent ends secured by means of coil springs 79. These heater elements are supplied with voltage from the slip rings as stated.

In order to prevent scorching of the laundry while drying, a thermostatic switch 80 is provided. The switch 80 is preferably mounted in a well 81 formed inwardly of the tub side wall, as shown in FIG. 3. The contacts of switch 80 are in series circuit with all of the heating elements 7; therefore, if the tub wall reaches the temperature for which the thermostat is set, a temperature below the scorch temperature of such laundry as is normally washed in a machine, the contacts open and de-energize the heat elements.

THE MOTOR DRIVE 5 AND TRANSMISSION 6

As shown in FIGS. 2, 3 and 4, the motor 5 and transmission 6 are mounted on the bottom 44 of the frame. The motor may be single-phase and provided with a phase-shift capacitor 82 and a quadrature starting winding 83 and a centrifugal switch 84 whose contacts 85 (see FIG. 10a) open and cut out the starting winding when the motor has reached normal running speed. The centrifugal switch is provided with a set of back contacts 86 that open when the starting switch contacts 85 are closed and close when the starting contacts open.

The back contacts 86 are in series circuit with the heater elements 7. Therefore, when the motor 5 is being started and accelerating to normal running speed, the heater elements 7 are disconnected from the voltage supply. In that manner, the peak power demand is kept low at those times when the motor load is the highest. The same operation takes place when the transmision shifts from a low or an intermediate speed to a higher speed, because the motor speed drops in response to the increased load of acceleration to a value at which the starting switch contacts 85 close and connect the capacitor 82 and starting winding 83 to the voltage supply.

THE TRANSMISSION 6

Figure 8:
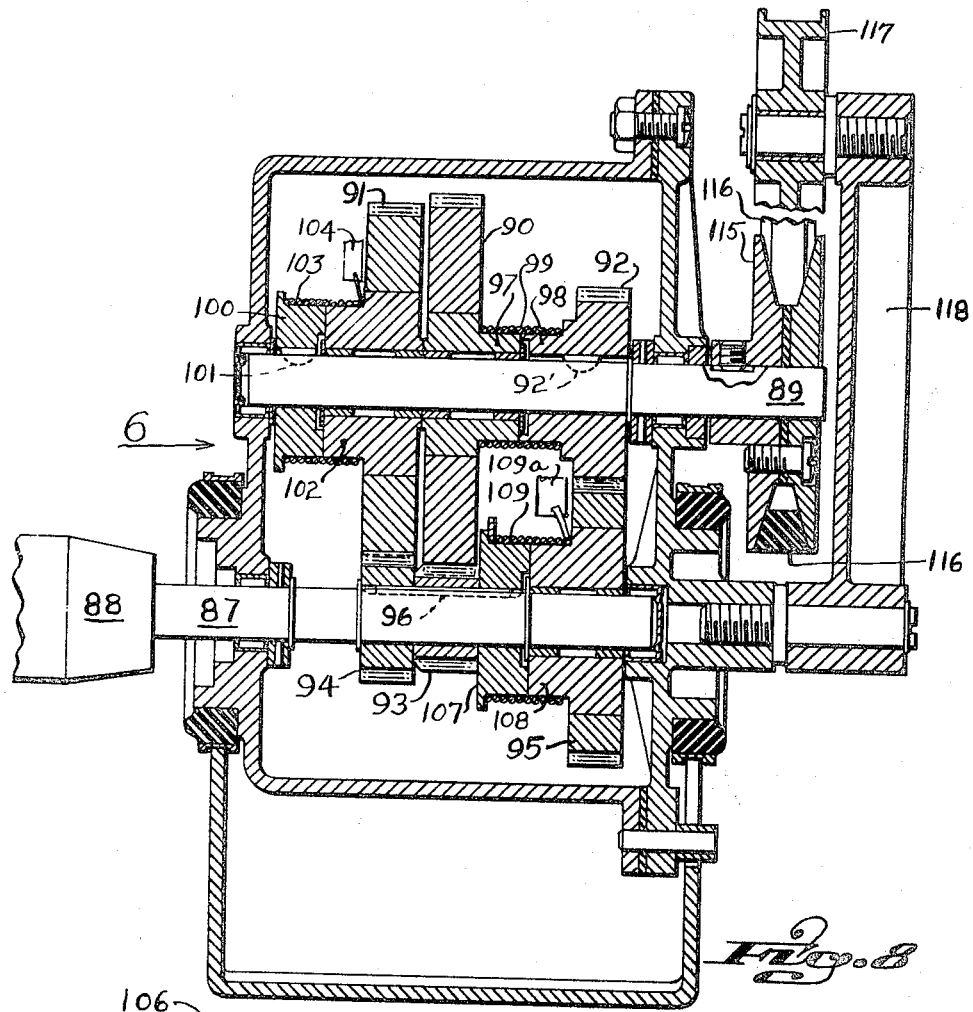
FIG. 8 is an enlarged view in longitudinal, vertical section of the transmission through which the tumbler tub is driven by the motor.
Figure 9:
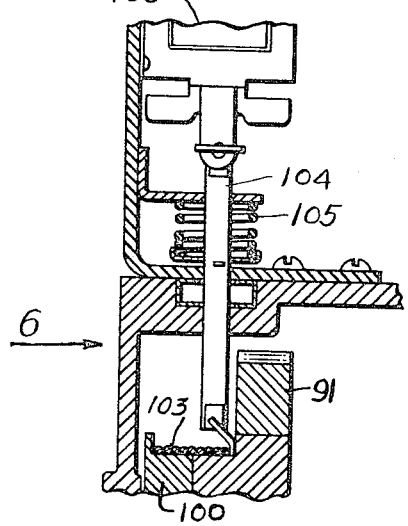
FIG. 9 is an enlarged partial view in section illustrating a clutch and a clutch shifter embodied in the transmission.

The motor shaft 86a is connected to the input shaft 87 of the transmission 6 by a flexible coupling 88. The transmission is shown in FIGS. 2, 3 and 4 and in greater detail by FIGS. 8 and 9. It comprises the input shaft 87, and an output shaft 89 on which output gears 90, 91 and 92 are mounted. The gears 90 and 91 run free on the shaft, while gear 92 is secured to the shaft by a key 92'.

The input shaft 87 is provided with drive gears 93, 94 and 95 that mesh with the respective gears 90, 91 and 92 on shaft 89. Gears 93 and 94 are keyed to the shaft 87 by a key 96, while gear 95 is free on the shaft.

When gear 90 is clutched to shaft 89, tub 2 is driven at tumble speed; when gear 91 is clutched thereto, the tub is driven at distribute speed; and when gear 95 is clutched to the input shaft 89, the tub is driven at the extraction or spin speed.

Gears 90 and 92 are provided with clutch hubs 97 and 98, respectively, and over-running clutch band 99 in the form of a coil spring so would that when gear 90 is the driven gear, that portion of the spring embracing hub 98 grips the same and drives gear 92 and the output shaft 89.

Gear 91 can be clutched to shaft 89 to provide the distribute speed, by means of a clutch member 100 secured to shaft 89 by a key 101, a clutch hub 102 on gear 91 and a clutch band 103 of the coil spring type embracing the member 100 and the hub 102. Clutch spring 103 is so wound as to lightly grip member 100 at all times while the other end, when released, frictionally grips the gear hub 102.

Clutch band 103 can be released to non-driving condition by means of a plunger 104 (see FIGS. 2, 4, 9 and 10) that is actuated to clutch release position by means of a compression spring 105 and to clutch engaging position by means of a solenoid 106 controlled by the timer 8 (see the circuit in FIG. 10a) to establish the distribute speed drive for the tub.

Gear 95 may be clutched to or released from shaft 87 by means of a clutch member 107 keyed to shaft 87, a clutch hub 108 on gear 95 and a clutch band 109 of the coil spring type, that embraces member 107 and the hub 108. Clutch band 109 is so wound that it always has a light friction grip on member 108. Thus, when the end of the portion of the spring on hub 107 is free, the spring winds up and tightly grips the clutch member and the hub. The clutch band is held in clutch-release position by means of a spring-biased solenoid plunger 109a (see FIG. 10) and is permitted to move to clutch engaging position by a spin speed control solenoid 110 (see FIGS. 2, 4 and 10a). The solenoid 110 is energized by a time-delay relay (see 127 of FIG. 10a) to effect spinning speed drive of the tub. The time delay relay is energized when the distribute speed solenoid 106 has been energized.

When gear 90 is driven, clutch bands 103 and 109 are released, thereby allowing gears 91 and 95 to run free on their respective shafts. In the case where gear 91 is the driven gear, clutch band 99 over-runs clutch hub 98 of gear 92, whereby the tub 2 is driven at distribute speed. When the clutch band 109 is released to engaged position, clutch band 103 is in release position and clutch band 99 over-runs gear 90; therefore, the gear 92 is the driven gear and tub 2 is driven at extraction speed.

The output shaft 89 has a pulley 115 thereon that drives a belt 116 running in the pulley 20' on the rim 20 of the tub end wall 11. An idler pulley 117 is provided and mounted on a swing arm 118 to which a spring 119 is connected, to provide the necessary belt tension.

The machine, as illustrated in FIG. 2, shows the heating elements 7 uncovered. It is to be understood that a layer of suitable insulation such as glass fibers, for example, is required and is best wrapped around the tub to totally enclose the tub and the heating elements, thereby conserving heat. The efficiency of the machine as a dryer approaches the efficiency of the insulation.

The J frame 4 of the machine, as shown and described, provides the foundation for the cabinet. The cabinet or dress-up shell 4A may be open at the back so that it can be slipped on or off with ease as needed for servicing the machine and easy replacement of parts.

THE TIMER AND CONTROL CIRCUITS
FIGS. 1, 11–14 and 10a

Figure 10A:
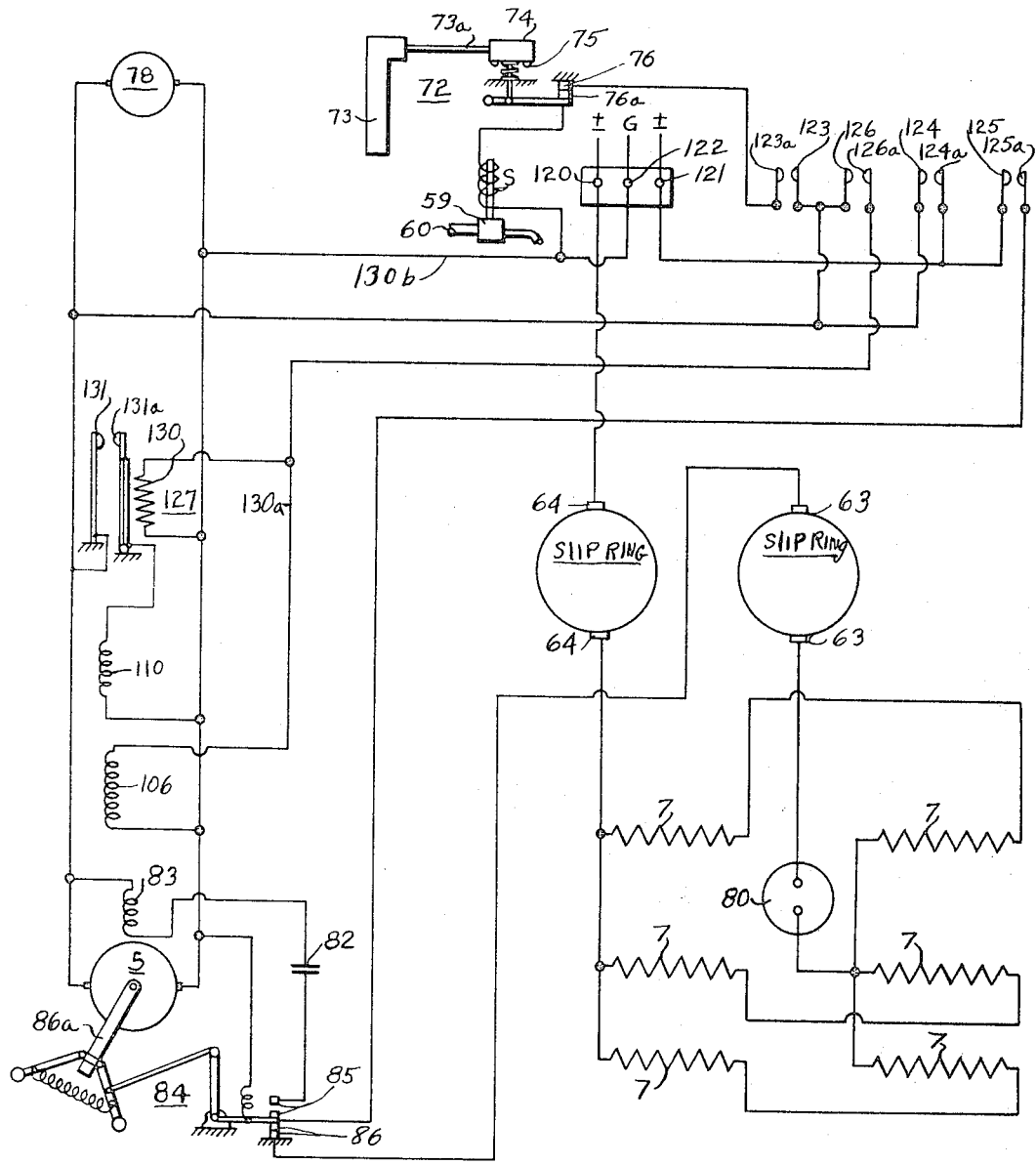
FIG. 10a is a schematic illustration of the control circuit of the machine.

FIG. 10a illustrates schematically the circuits by which the wash, distribute, spin, rinse, distribute, spin, and drying cycles are accomplished. There is one wash cycle followed by one or more rinse cycles, the rinse cycles being interspersed with distribute and spin cycles. The voltage supply terminals for the machine are indicated at 120, 121, and 122, terminal 122 being at ground or neutral.

The timer 8 includes contacts 123–123a, 124–124a, 125–125a, and 126–126a that control, respectively, the admission of water for washing and rinsing, energization of motors 5 and 78 and simultaneously establish the tumbler speed and the energization of heater elements 7, and subsequently the establishment of the distribute speed of the tub. The closing of the distribute speed contacts 126–126a effects the energization of the thermal time-delay relay 127 that controls the spin speed solenoid 110 of the transmission 6. The construction of the timer 8 is shown in FIGS. 11–14.

The water control contacts 123–123a are connected in series with the contacts 76–76a of the level control means 72 and the solenoid S of the valve 59. Contacts 124–124a control the energization of the motors 5 and 78 whereby motor 5 drives tub 2, through the transmission, at the tumble speed, and the motor 78 drives the exhaust fan. The length or duration of the tumble speed or washing operation may be adjusted at the timer 8. The contacts 125–125a close when contacts 124–124a close and energize the heater elements 7 through the back contacts 86 of the centrifugal starting switch 84 when motor 5 is at normal running speed. Contacts 126–126a energize the distribute speed solenoid 106 of transmission 6. When contacts 126–126a close, the heater 130 of relay 127 is energized through conductors 130a and 130b. After the lapse of the time delay interval of relay 127, contacts 131–131a of that relay close to energize the spin or extraction speed solenoid 110 of the transmisison.

As the transmission shifts from one speed to a higher speed, the load on the motor causes it to slow down to the speed at which the starting switch 84 closes its contacts 85 to introduct the starting winding 83 and the capacitor 82 into the starting circuit and simultaneously de-energize the heaters 7. When the motor regains its normal speed, the centrifugal switch means contacts 85 and closes the back contacts 86 whereby the heater elements 7 are reconnected to the voltage supply. By means of the back contacts on the centrifugal switch 84, the total electric load taken by the machine is maintained below a predetermined maximum peak value.

The duration of the spinning operation is controlled by timer 8 and when it has run out, the transmission is shifted back to tumble speed. Since the water control contacts 123–123a and the level control contacts 76–76a are closed, the solenoid valve 59 opens to admit water for the rinse cycle. The duration of the rinse cycle is controlled by the timer. The rinse cycle includes the tumble, distribute and spin operations (which may be repeated two or more times) that are controlled in the same manner as in the wash, distribute and spin cycles. Water is admitted for a time during the rise-spin cycle to subject the laundry to flushing action while extraction proceeds.

At the completion of the rinse-distribute-spin cycle, the circuit for the water valve solenoid S is de-energized so that water cannot be re-admitted until a new load of laundry is placed in the machine and the timer is reset. However, the transmissoin is shifted back to the tumble speed position because the motor control contacts 124–124a have remained closed and the time-delay contacts 131a–131b have opened. The heater elements 7 remain on during the tumble drying operation for a period of sufficient duration to bring the water retention of the laundry down to that of approximately fluff-dry. The heater elements are then de-energized, but the tub continues to be driven for a time called the "cooling period" to effect cooling of the drum and to utilize as much stored heat as possible for drying.

It is to be noted that water is introduced into the machine while the motor is accelerating to tumble speed. At this point the heaters are energized, thus heating the water from inlet temperature to a maximum temperature which is determined or limited by the length of the tumbler speed cycle. Therefore, the temperature of the water is automatically controlled by the length of the washing operation, which is preset by the operator to suit the type of clothes being washed. For that reason, certain fabrics or garments that cannot stand high temperature washing may be washed with safety at low temperature merely by adjusting the length of the washing period.

The timer 8, as shown in FIGS. 11–14, comprises a shaft 140 journaled in a housing 141, and a spring motor 142 of well-known form and construction, geared to the shaft. To start the timer, the shaft 140 is turned in one direction to a maximum position whereby the spring is wound up. When the shaft is released, it is driven in the opposite direction by the unwinding of the spring at a constant rate.

Keyed to the shaft 140 are two cams 143 and 144 that actuate the motor control and heater element control contacts 124–124a and 125–125a, respectively, and a friction-driven, printed circuit disc cam 145 that controls the admission of water, and the distribute and spin speed solenoids 106 and 110 of the transmission. The travel of cam 145 in the wind up direction is limited by a stop 142a. The circuit controlled by cam 143 is "on" from the time the timer is set, to the end of the wash, rinse, and drying cycles. FIGS 12 and 13 show that the motor 5 will run for approximately five minutes after the heater circuit has been interrupted by the heater cam 144.

The printed circuit cam 145 is coupled to the shaft 140 by a friction disc clutch 146. The clutch is mounted between a tumble wash time adjusting member 147 pressed on the hub 145a of the cam, and a spring motor wind-up knob 148 keyed to the shaft. The adjusting member 147 carries a pointer 149 to indicate the length of the tumble cycle for the washing of clothes. Thus, by turning the knob 148 to the full wind-up position, the printed circuit cam 145 turns with it, but it may be manually returned to any selected point to establish other washing periods of shorter duration.

As shown in FIG. 14, the printed cam 145, so called, includes a single metallic portion set in insulating material and having sections 150, 151 and 152, provided with sliding contacts 150a, 151a and 152a. Section 150 controls the water control valve solenoid S. Section 150 is interrupted by a section of insulating material 150d to provide for the shutting off of water for a short period before the rinse cycle commences.

Section 151 is a common connection and is connected to one side of the supply line. Section 152 is interrupted by insulation as at 152b, 152c and 152d to establish the distribute speed operations of the transmission at the times required. The distribute transmission solenoid 106 is energized only when contact 152a engages one or another of the conducting portions of section 152. The legends on FIG. 14 indicate the length of time the several distribute operations are on.

MODIFIED FORM OF WASHER-DRYER MACHINE

The modification of FIGS. 15–19 includes the same basic laundry unit as in that already described. It comprises a tub 200 and a supporting cage or frame 201 therefor. The cage 201 comprises front and back frame members 202 and 203 rigidly connected by side frame members 204 and 205. The members 205 are arcuate in shape and substantially concentric with the axis of rotation of the tub 200.

Cage 201 is so designed that its front and back frame members 202 and 203 may rest upon and be secured to the top of the front and back walls 206 and 208, respectively, of the U frame 207 (FIGS. 17 and 18). To the back frame member 203 a removable access plate 207a is secured. That plate extends upwardly from the U frame back wall 208.

The front frame 202 (FIGS. 15 and 16) may be a die casting formed with flanged arcuate ends to accommodate the curvature of the side members 204 and 205, and provided with a centrally located substantially square border 209 defining an opening 209a for the accommodation of laundry. Ribs 210 extend from the corners of the border 209 to the outer corners of the frame as shown. Within the border 209 to the outer corners of the frame as shown. Within the border 209 the frame is formed with a specially designed annular flange 222 that constitutes a hollow stub journal provided with an anti-friction bearing 213 on which the front end of the tub 200 is rotatably supported. The inner face of that flange slopes downwardly and inwardly of the tub and is covered by a snap-on seal ring 214 of rubber or plastic or other suitable material. The outermost face of the flange 212 is provided with a cylindrical step 215 that is concentric with the rotational axis of the tub so as to accommodate the inner race 216 of the bearing. The flange is stepped as shown towards the U frame wall 206, whereby a flange 217 is formed to which the front wall of the U frame may be bolted or otherwise suitably secured.

The opening 209a may be opened or closed by a door 218 hinged as shown and slotted at 219 to provide for the flow of ambient air through the tub. The door is sealed when in closed position by an out-turned lip 220 which may be an integral part of the seal 214.

The back cage frame 203 is shown in plan and in section in FIGS. 16 and 17, respectively. It, too, is preferably a die casting and formed at its center with a hollow journal 222. The outer surface of the back member 203 is provided with hollows 223 and 224 which, when covered by plate 225 and a plate 207a, respectively, constitute a fan housing and a duct for carrying vapors from the tub to the fan. The frame may be ribbed as at 227 and 228 to strengthen the same and flanged as at 229 and 230 to which the back of the U-frame may be bolted. The frame may be provided also with a shelf 231 on which a brush holder 232 may be mounted. The holder 232 carries brushes 233 and 234 on each side thereof (see FIG. 16) located so as to ride on slip rings 235 and 236.

The inner portion of the journal 222 is stepped to provide a surface concentric with the rotational axis of the tub to accommodate the inner race 237 of an anti-friction bearing 238 on which the rear end of the tub is rotatably mounted.

The hollow 223 is provided with a bearing boss 239 for receiving a bearing 240 in which a shaft 241 is journaled and to the inner end of which a fan blade hub is secured. The hub 243 is provided with blades 244 that run in the housing 222–225 to carry the vapors out of the tub. The vapors enter the fan housing through an opening 245.

Plate 225 is provided at its lowermost point with an opening 226 (FIG. 16) through which condensate, formed in the fan housing may drain to the outlet at the hollow journal of the machine. FIG. 16 also shows an opening 226a in the back frame 203 that may be used to expose the interior of the cabinet of the machine to the exhaust of the fan for cooling the same and also, in the case of gas, in lieu of electric heat being used, for the removal of the products of combustion to a disposal point.

The outer end of the fan blade shaft has a pulley 247 secured thereto, over which a drive belt 248 runs. The drive belt, as will be shown infra, is driven from the same motor that drives the tub.

In the central vertical region of the back frame 203 is a groove for accommodating a water inlet tube 250. As shown in FIGS. 17 and 19, the tube is of substantially right angle shape with the base of the angle extending through the hollow journal 222. At the discharge end of the tube is a lip 251 that serves to spray the water into the laundry compartment of the tub.

Above the upper end of tube 250 is a funnel 252 into which the outlet of the solenoid valve 253 discharges. The water is all velocity head as it strikes the funnel.

The tub 200 comprises an imperforate wall 255 that flares from front to back, the flare being about ½" in 20" of length. The front end of the tub is closed by a wall 256 formed from sheet metal. At the front end of the peripheral edge of the wall 255 is flanged outwardly to so accommodate the front end wall 256 that it may be welded or otherwise secured to provide a water-tight joint. The central portion of the front wall 256 has a relatively large opening 257 therein embracing the journal 212. It is provided with an inwardly extending stepped flange 258 that forms a retainer for the outer race 259 of the bearing 213. The flange 258 also accommodates a resilient snap-on seal 260 of rubber or plastic, so shaped as to protect the bearing from water and detergent solution.

The back end of the tub is formed with an outwardly extending annulus 261 that constitutes a runner for the annulus of water formed when the tub is rotated at extraction speed, and at the outermost end it is provided with a groove 262 to accommodate a drive belt 263. The back end of the tub is closed by a wall 264 formed of sheet metal and having an outwardly extending flange 265 at its outer periphery to which the annulus 261 is welded or otherwise secured to form a water-tight joint.

The tub is divided into a laundry load compartment 266 and a water level control and voiding compartment 267 by a partition 268 located adjacent to but spaced from the back wall 264. The outer edge of the partition 268 may be curved inwardly and perforated as at 269 to provide an annular screen that prevents the passage of line, threads, and other small objects into the compartment 267 when the machine is running at spinning speed. The marginal edge of the screen flange may be welded or otherwise secured to the tub as shown.

The back wall 264, the front wall 256, and the partition 268 may be formed with stiffening ribs 270, 271 and 272, respectively, so spaced and located as to give the necessary rigidity to these members.

Partition 268 is provided with a central aperture 273 having a snap-on lint screen 274. As shown, the marginal edge of the opening 273 may be formed with a hook-shaped flange 275 to receive a similarly shaped marginal flange 276 on the lint screen. Thus, the screen may be placed in operative position on or removed from the flange 275, to uncover the opening 273 by merely deforming it sufficiently to disengage it from its retaining flange 275.

The laundry compartment 266 may be provided with several baffles 266a only one of which is shown. These baffles are tapered to conform to the taper of the imperforate tub wall; however, the upper edge thereof is made parallel to the axis of rotation of the tub. Thus the baffles increase in radial depths as they approach the partition 268, to compensate for the greater depths of water when the tub 200 is at tumbling speed.

In a machine of the type disclosed, where the diameter of the tub is approximately 26 inches, it has been found that three baffles placed about 120° apart are sufficient. These baffles may be of the order of 3¼ inches high at the back and approximately 3 inches high at the front. Thus they will handle the greater depth of water that occurs at the back of the tub during the washing speed of the tub.

The tub back wall 264 is also provided with an opening 277 that is framed by a rearwardly projecting tubular flange 279 formed as an integral part of the back wall 264. The flange 279 forms a hub or journal for the tub.

As shown, the journal 222 is stepped to accommodate the inner race 237 of the anti-friction bearing 238. The outer race 280 of the bearing is mounted in a resilient ring 281 of substantially L-shape which forms a seal for the bearing as the long leg 282 thereof engages the inner race 237 inboard of the rollers of the bearing. The end wall 264 is provided with an annular member 283 that engages the inner edge of a bearing mount 284 and acts as a retainer therefor. The bearing 238 may be provided with an annular ring 285 serving as a retainer for the outboard side of the bearing.

The compartment 267 houses the water level control means 72 (FIG. 10a) and the voiding scoop, the details of which are shown more particularly in FIGS. 18 and 19. These views illustrate more in detail the level control means, the voiding means, and the fill tube and the manner in which it receives water from the solenoid valve 253. The water level control means and the water voiding means are formed as a unit from a relatively flat plate 286 to which two channel members 287 and 288 are seam-welded, with the openings of the channels facing the plate 286, to form air and water-tight joints throughout.

The channel 287 and the plate 286 constitute the air trap tube of the water level control means. As shown, it flares outwardly at the bottom 289 so that a relatively large volume of air may be accumulated before the water level rises to compress it into a smaller and smaller volume. The larger air volume gives more sensitively to changes in water level. The upper end of the air trap tube is provided with a nipple 300 to which a flexible hose 301 is attached to transmit the air pressure to the diaphragm chamber 74 (FIG. 10a) of the pressure switch means 72 (FIG. 10a).

The channel 288 and the plate 286 form the scoop or voiding tube. As shown, its lower end curves contra to the rotation of the tub and is provided with a flexible scraper 290 having a knife edge tip 291 bearing against the bottom of the water annulus channel. The scraper 290 may be made of "Teflon" or other suitable material and riveted or otherwise secured to the scoop tube as shown at 292. When the tub is rotating at extraction speed, the scaper 290 directs the water into the bottom of the tube (286–288) through which it rises and discharges through the opening 293 at the top thereof. The water flows into the hollow journal 222 and out at the fitting 294 to drain by means of a hose not shown.

FIG. 16 illustrates the drive from the transmission to the tub and to the impeller of the fan. As there shown, the belt 263 is driven by a pulley 295 on the output shaft of the transmission 296, and the transmission by a motor 297. The transmission also includes a pulley 298 over which the fan drive belt 248 runs. Thus motor 297 drives both the tub and the exhaust fan.

The transmission 296 is, for reasons stated supra, a three-speed transmission. It is controlled by the timer 8 10a. It is preferably of the same construction as the transmission 6 and may be so considered.

CYCLE OPERATION OF THE MACHINE

To operate the machine, clothes are placed in the tub and the timer handle 148 turned to the right to a position corresponding to the total laundering time for the load involved. If the load is a standard 8-pound load of fabrics, the pointer 148 is turned to a position corresponding to the estimated total laundering time which may be assumed to be 60-minute period for purposes of explanation. That 60-minute period will comprise the regular or usual 12-minute wash cycle, the regular 6-minute rinse cycle, the regular 6-minute final spin cycle, the estimated 30-minute drying cycle and the regular 6-minute cool-down cycle.

At the conclusion of the wash cycle, the machine provides a deep rinse, following which the rinse water is purged at spin speed. When a given portion of the rinse-spinning has been completed, the water valve is opened by the timer 8, whereupon a spray-rinse is effected for a period following which the final spin-cycle is completed, and the timer puts the transmission in tumbler speed, the lowest speed. The tub is driven at tumble speed to the end of the laundering cycle. However, the timer cuts off the heaters about 5 minutes before the end of the total cycle so as to provide the so-called cool-down cycle. At the conclusion of the cool-down period, the timer will have run out. The machine stopped and all control circuits are opened.

It is to be observed that even though the timer 8 is set for a 60-minute total estimated laundering time, the length of the wash cycle may be shortened, according to the kind of fabrics being washed, by merely turning the wash time pointer 149 towards the starting or zero position of the timer. It is by means of the independently adjustable wash-time setting that the maximum temperature rise of the wash water or solution may be controlled. This is because the temperature rise is a function of time and heat energy input to the wall of the tumbler tub. By controlling the time of heat input, the temperature rise is thereby limited.

Overheating of the tub wall during the drying cycle is prevented by the thermostatic control switch described supra.

Having thus described the invention, it will be apparent to those of ordinary skill in the art to which the invention pertains, that is illustrated embodiments of the invention may be changed and modified without departing from either the spirit or the scope of the invention.

Therefore, what is claimed as new and desired to be secured by Letters Patent is:

1. A laundry washer-dryer assembly comprising a single tumbler tub having an imperforate wall and a support cage having end frames and side members rigidly connecting the end frames in fixed, spaced relation to each other, the end frames and the ends of the tub having cooperating hollow journals and stub shafts by which the tub is rotatably supported at each end, the journal and stub shaft at one end being of such diameter as to provide for the introduction of laundry into the tub and removal of the same therefrom.

2. An assembly as in claim 1 in which the end frames are rigid cast members and the side members comprise spacers and tie rods rigidly securing the end frames against the spacers in fixed relation to each other.

3. An assembly as in claim 1 in which the side members comprise plates rigidly secured at their ends to the end frame members.

4. A laundry washer-dryer as in claim 1 in which the stub shafts are on the tub ends and project outwardly therefrom, the journals are on the end frames, each of the latter including an inwardly projecting flange disposed within the stub shafts, respectively, that anti-friction bearings are retained between said flanges and the stub shafts and that a seal is secured to the inner face of the front end frame journal to house and enclose the journal, stub shaft and bearing, said seal having an opening substantially coextensive with the clothes load opening in the front frame.

5. A laundry washer-dryer as in claim 4, in which the opening in the front frame is provided with a swinging door, and that the seal has a lip disposed to engage the inner face of the door and seal the same when closed.

6. A laundry washer-dryer as in claim 4, in which the anti-friction bearings are provided with inner and outer races and that the bearings are mounted in a resilient damping and seal member which retains the outer races thereof and sealingly engages the journals.

References Cited

UNITED STATES PATENTS

| | | | |
|---|---|---|---|
| 2,370,285 | 2/1945 | Beede et al. | 68—144 |
| 2,637,189 | 5/1953 | Douglas | 68—144 X |
| 2,706,899 | 4/1955 | Meyer | 68—24 |

WILLIAM I. PRICE, *Primary Examiner.*